United States Patent [19]

Ruether et al.

[11] 4,314,100
[45] Feb. 2, 1982

[54] DATA DETECTION CIRCUIT FOR A TASI SYSTEM

[75] Inventors: Peter G. Ruether, Boulder; Patrick A. Vachon, Arvada; John F. O'Neill, Boulder, all of Colo.

[73] Assignee: Storage Technology Corporation, Louisville, Colo.

[21] Appl. No.: 115,107

[22] Filed: Jan. 24, 1980

[51] Int. Cl.³ .............................................. G10L 1/00
[52] U.S. Cl. .............................. 179/1 SC; 179/1 VC; 179/1 P
[58] Field of Search ................. 179/1 SC, 1 P, 1 VC, 179/2 DP; 370/81; 375/104

[56] References Cited

U.S. PATENT DOCUMENTS

| | | | |
|---|---|---|---|
| 3,304,372 | 2/1967 | Filipowsky et al. | 179/2 |
| 3,985,956 | 10/1976 | Monti et al. | 179/1 SA |
| 4,001,505 | 1/1977 | Araseki et al. | 179/1 SC |
| 4,027,102 | 5/1977 | Ando et al. | 179/1 SC |
| 4,057,690 | 11/1977 | Vagliani et al. | 179/15 AS |
| 4,061,878 | 12/1977 | Adoul et al. | 179/1 SC |

Primary Examiner—Charles E. Atkinson
Assistant Examiner—E. S. Kemeny
Attorney, Agent, or Firm—Woodcock, Washburn, Kurtz, Mackiewicz & Norris

[57] ABSTRACT

Disclosed is a circuit for determining whether an incoming signal is a speech signal or a data signal. In the preferred embodiment, means for separating the incoming signal into a low frequency component and a high frequency component are provided. The low frequency component consists of frequencies above 1000 Hz. frequency, namely 1000 Hz. and the high frequency component conists of frequencies above 1000 Hz. Means are also provided for the comparison of the energy level of the high frequency components with a multiple of the energy level of the low frequency components. Also, means are provided for comparing a multiple of the energy level of the low frequency components with a maximum threshold and for comparing the energy level of the high frequency components with a minimum threshold. Further, means are provided for detecting whether the incoming signal has a slope. Data is determined to be present when the energy level of the high frequency components exceeds a multiple of the energy level of the low frequency components, and when the energy of the low frequency components is less than a maximum threshold and when the energy level of the high frequency components is greater than a minimum threshold and when the incoming wave has no slope all occurring simultaneously for a preselected period of time.

10 Claims, 2 Drawing Figures

DATA DETECTION CIRCUIT FOR A TASI SYSTEM

BACKGROUND OF THE INVENTION

This invention relates to time assignment speech interpolation systems and more particularly to a data detector for such systems.

Because of the extremely high cost of communications transmission facilities, e.g., satellite channels and undersea transmission lines, the prior art has sought various means to maximize the efficiency of existing transmission facilities. One such system is known as a time assignment speech interpolation (TASI) system. In a typical TASI system, calls from n callers are transmitted across, for example n/2 transmission facilities to a remote location. At that location, the n/2 facilities are connected to n output speech channels. TASI systems operate on the assumption, verified as a statistical fact, that at any given time not all callers in a large group will wish to talk simultaneously. In fact, as a general rule, callers are actively talking less than half of the time the talker and the listener are interconnected. Accordingly, TASI systems may be defined as switching systems which interconnect talker and listener only when the talker is actively speaking, provided there is a transmission facility available at that time.

TASI systems are designed to multiplex only speech. The present invention relates to a TASI system designed to carry both speech and data interchangeably.

When an input channel carrying speech is switched to a transmission facility, there is some loss of information in a TASI system. Typically, 1% of the speech signal may be lost through "clipping" caused by the delay between the time speech is first detected and the time switching is accomplished. This is acceptable because a 1% loss in speech content is generally not objectionable to the listener. However, when a TASI system is used to transmit data, a 1% loss of information is unacceptable. Therefore, statistical switching must be disabled and a transmission facility dedicated to a caller who is transmitting data in a TASI system designed to carry both speech and data. In order to do this, a reliable data detector must be provided which can accurately distinguish data from speech. Typically, the standard data sets which are in abundant use display a full duplex format which contains energy in the range 2010 to 2240 Hz. However, not all data formats in use contain energy in this range. Therefore, it is not desirable simply to utilize a frequency discriminator to detect data within a particular frequency range.

Related Applications

DIGITAL MEMORY PROVIDING FIXED AND VARIABLE DELAYS IN A TASI SYSTEM by Glenn R. Clingenpeel, Ser. No. 863,903, filed Dec. 23, 1977, now U.S. Pat. No. 4,184,051, describes a TASI system upon which the present invention is an improvement. The disclosure thereof is incorporated herein by reference.

SUMMARY OF THE INVENTION

In accordance with the present invention, a time assignment speech interpolation system is used to transmit both speech and data interchangeably.

In accordance with this invention, a data detector reliably detects data regardless of the format of the data.

Moreover, in accordance with a further aspect of this invention, data is detected by comparing the energy level of low frequency components and high frequency components of an incoming signal with each other and with predetermined minimum and maximum values and by detecting whether there is any slope, i.e., variation in average amplitude with time, in the amplitude of that signal.

Further in accordance with a preferred embodiment of the present invention, data is detected on a particular channel by dividing the spectrum of the incoming channel signal to determine the energy level above and below a specified frequency. A DATA PRESENT signal is produced if the energy above the specified frequency is greater than a certain multiple of the energy level below the frequency and if the energies above and below the specified frequency are within certain thresholds and if there is no slope in the signal, and further if these conditions are present for a specified period of time. When a DATA PRESENT signal is generated, the switching of the channel is inhibited.

DESCRIPTION OF THE PREFERRED EMBODIMENT

Figure 1:
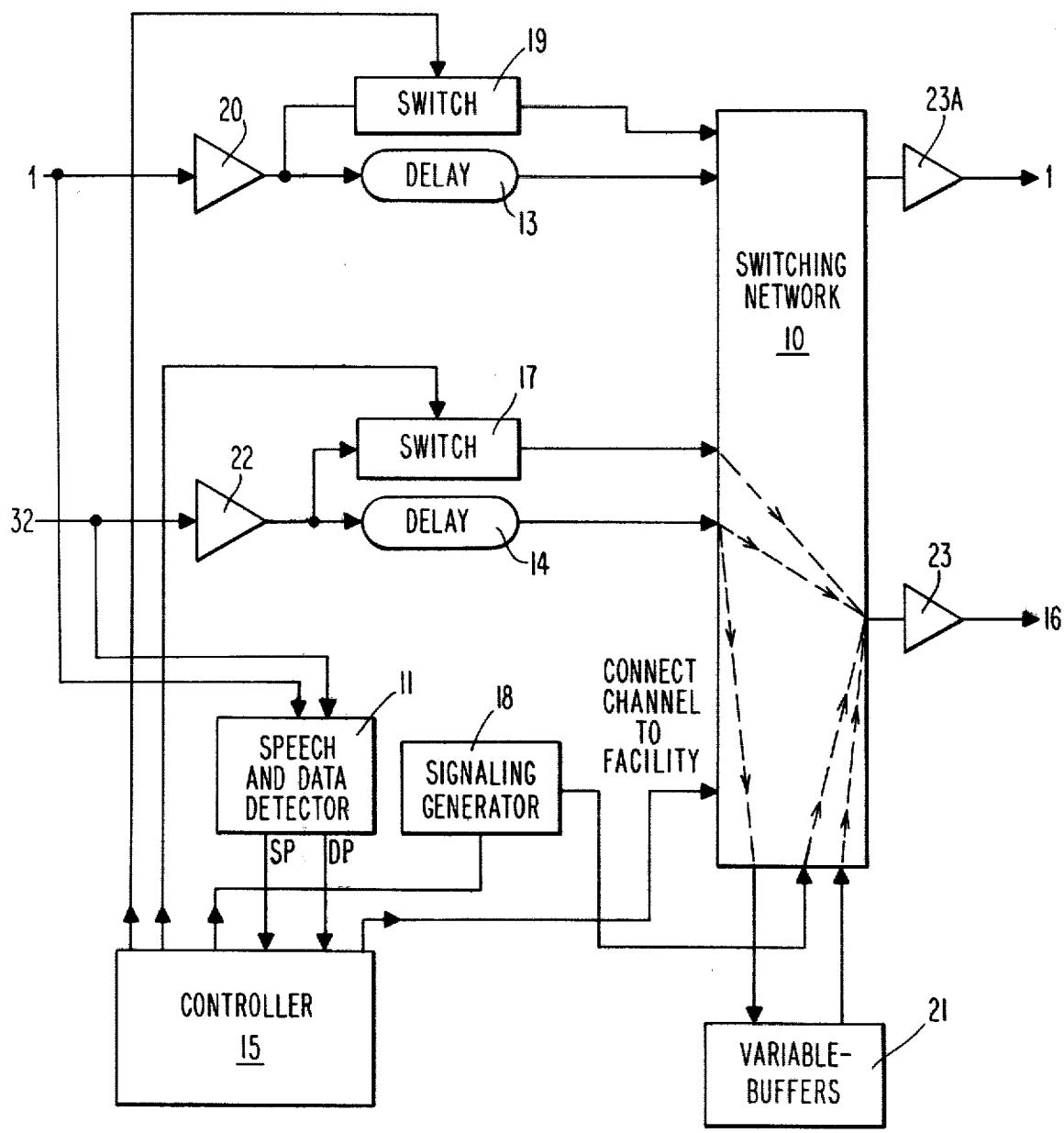
FIG. 1 is a block diagram of one terminal of a time assigned speech interpolation system with which the circuit of the present invention finds utility.

Before describing the present invention, the sending side of a TASI system will first be described with reference to FIG. 1.

In this example, there are 32 input channels of which only channel 1 and channel 32 have been shown. As is conventional in such systems, speech signals from the input channel are applied to switching network 10 which selectively connects an input channel to an available transmission facility 1 . . . 16. Only transmission facilities 1 and 16 have been shown. Typically, there are half as many transmission facilities as there are input channels. A central speech and data detector 11 detects the presence of a signal on an input channel. In response to the detection of speech or data on the input channel, an SP signal indicating that speech is present or a DP signal indicating data is present are produced. In response to an SP signal, controller 15 operates switching network 10 to connect the input channel to an available transmission facility. FIG. 1 shows input channel 32 connected to transmission facility 16.

When data is detected by speech and data detector 11, a DATA PRESENT signal is produced. This signal is applied to controller 15 which thereafter does not operate switching network 10 to disconnect that channel from its transmission facility. However, when the data is detected, controller 15 also operates switches, such as 17 or 19, which bypass the transient fixed delays 13 and 14 which are normally inserted into a channel when speech is present and switching is being performed. For example, if data is detected on channel 1, the switch 19 is closed, thus bypassing the delay 13 so that this delay is not interposed in the channel when data is present.

Fixed delays 13, 14 and others are connected between each input channel and switching network 10. The purpose of delays 13 and 14 is to provide a time interval during which a symbol from signalling generator is applied to the transmission facility when speech is transmitted. This symbol from signalling generator 18 identifies the input channel 1-32, to which the transmission facility has been assigned. In the example shown in FIG. 1 signalling generator 18 generates a symbol representing input channel 32. This symbol is applied to the transmission facility 16 before the speech signal, sometimes referred to as a speech burst in order that the receiving side of the system can determine which conversations it is receiving at any given time. The delay 14 normally provides the time interval required to insert the symbol before the speech signal.

Switches such as those shown at 17 and 19 are in parallel with each such fixed delay. These provide the capability of switching the fixed delay out of the sending side of the system when data rather than speech is detected. When speech is transmitted, switching takes place after the first speech burst as long as a transmission facility is connected to a particular input channel.

Signals from the input channels are converted into digital (P.C.M.) form by means of the analog-to-digital converters 20 and 22. These digital signals may be stored for variable times in variable delay buffers 21, and then transmitted when a facility becomes available. Further explanation of variable delay buffers 21 may be found in the aforementioned application of Clingenpeel. The digital signals are reconstituted to analog signals by the digital-to-analog converters 23 and 23A before the signals are applied to the transmission facilities 1-16.

Figure 2:
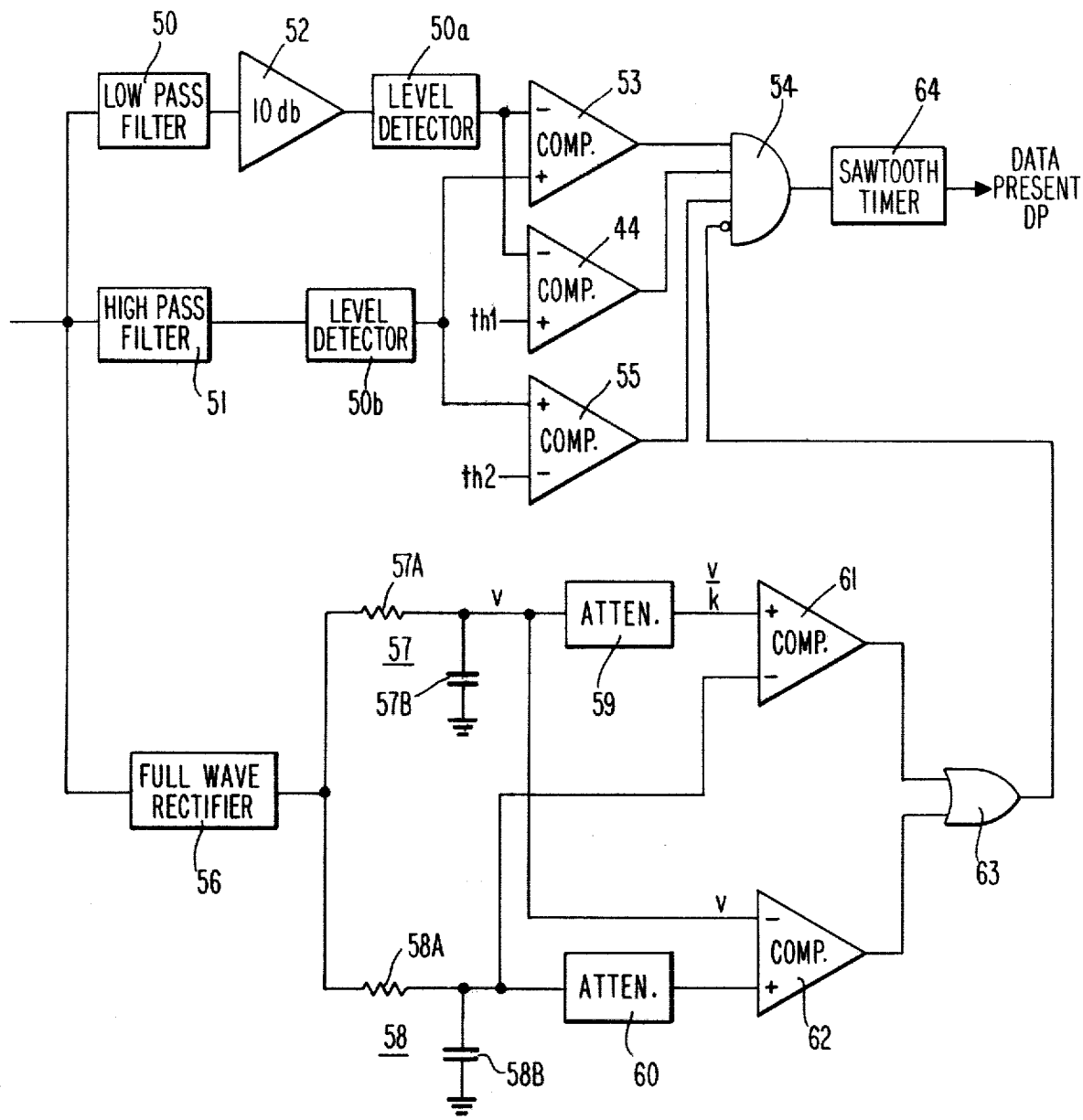
FIG. 2 shows the data detector circuit of the present invention.

Incoming signals from each of the input channels 1-32 are applied to the speech and data detector 11. Referring to FIG. 2, the data detection circuit for one of the input channels 1-32, and which forms a portion of speech and data detector 11 is shown. Incoming signals are first applied to a means for separating the low frequency components from the high frequency components of the signal. This separating means includes the low pass filter 50 and the high pass filter 51. The low pass filter 50 passes the signal below a specified frequency and the high pass filter 51 passes the above the specified frequency. In the preferred embodiment of the present invention, the specified frequency is approximately 1000 Hz. since it has been determined that most speech signals have predominant energy below 1000 Hz. while most data signals have predominant energy above 1000 Hz.

However, since it has also been determined that persons voices may generate some speech signals having frequency components comparable to those typically utilized for data tansmission in addition to low frequency components, the present invention employs an amplifier 52 which increases the energy level of the low frequency component, e.g. by providing approximately a 10 db boost in the power of the output of low pass filter 50. The energy from low pass filter 50, as amplified by amplifier 52, and the output of the high pass filter 51 are applied to level detectors 50A and 50B, respectively. The output of these level detectors are applied to comparator 53 which produces an output only if the energy above 1000 Hz. is greater than a multiple of the energy below 1000 Hz. Preferably, this multiple is 3. A decision is then made that data is more likely than speech since a high frequency component is present which has an amplitude substantially above the low frequency component. The output of comparator 53 is supplied to gate 54 which determines whether other conditions are present which indicate that data rather than speech is present.

A comparator 44 is also provided which compares the detected energy below 1000 Hz. with a threshold designated as th1 which, in the preferred embodiment is −24 dBm. The comparator 54 produces an output only if the detected energy below 1000 Hz. is below this threshold, th1. The output of comparator 54 is also directed to gate 54. Thus, the likelihood that data is present rather than speech is increased if it is determined not only that energy level of the low frequency component energy is substantially below that of the high frequency component but also that the low frequency energy level is lower than would be expected for normal speech signals as determined by comparator 44.

A comparaor 55 is also provided which produces an output if the detected energy above 1000 Hz. is above a threshold th2 and this output is also directed to gate 54. In the preferred embodiment th2 is approximately −30 dbm. Thus, the likelihood that data is present rather than speech is still further increased when it is further determined that the high frequency component has sufficient amplitude to be predicted to be data by means of comparator 55.

Finally, the last input to the gate 54 is the output of slope detector 58. The slope detector 58 includes a full wave rectifier 56, and time constant circuits 57 and 58. Time constant circuit 57 comprises resistor 57A and capacitor 57B, have a short time constant T. Time constant circuit 58 comprises resistor 58A and capacitor 58B and has a long time constant 4T. Attenuator 59 attenuates the short time constant signal and attenuator 60 attenuates the long time constant signal. The comparator 61 compares the attenuated short time constant signal with the unattenuated long time constant signal. The comparator 62 compares the unattenuated short time constant signal with the attenuated long time constant signal.

If there is no slope in the incoming signal, the output of both comparators will be low, thus indicating that the likelihood that data rather than speech is present is even further increased. If the incoming signal's detected energy has a rising waveform, the output of the comparator 61 will be up and the output of the comparator 62 will be down; if the signal has a decreasing waveform, the output of comparator 61 will be down and the output of comparator 62 will be up, in either case indicating the likelihood that data is not present.

The outputs of comparators 61 and 62 are applied to an OR gate 63, the output of which is up when a slope is detected in the channel signal. This indicates that speech and not data is present. Therefore, the output of OR gate 63 inhibits gate 54, thereby inhibiting a DATA PRESENT SIGNAL when there is slope in the channel signal.

As an example of the operation of the slope detector 58, first assume that the speech channel has no slope and the amplitude is v. The output of both time constant circuits 57 and 58 is v. The output of both attenuators 59 and 60 is v/k where k is greater than unity, such as 1.2. The plus input of both attenuators 61 and 62 is v/k and the minus input is v. Therefore the output of both comparators will be low.

Now assume a rising amplitude signal. The short time constant circuit 57 will reach a level of, for example, 2v, while the long time constant circuit 58 still has a voltage of v. The plus input to comparator 61 is 2v/k (which is greater than v) and the minus input is v, so that the output of comparator 61 is up. The plus input to comparator 62 is v/k and the minus input is 2v, so that the output of comparator 62 will be down.

If there is a decreasing amplitude channel signal, the voltage on short time constant circuit 57 will be, for example, v/2 while the voltage on the long time on constant circuit is still v. The plus input of comparator 61 is v/2k and the minus input is v so that the output is down. The plus input of comparator 62 is v/k and the minus input is v/2 so the output thereof is up, since k=1.2.

In this manner, a reliable detection of the sloping signals is obtained, and speech can be differentiated from data.

In the preferred embodiment, the output of gate 54 is applied to a timing means such as a sawtoothed timer 64. If the four conditions for data detection mentioned above are present continuously for a predetermined time, for example 128 milliseconds, the timer produces an output. This indicates that data is present.

While a particular embodiment of the present invention has been shown and described, it will, of course, be understood that various modifications may be made without departing from the principles of the invention. The appended claims are, therefore, intended to cover any such modifications within the true spirit and scope of the invention.

What is claimed is:

1. In a time assigned speech interpolation system in which incoming speech signals from a plurality of input lines are directed to a remote location via a lesser plurality of transmission facilities, said system including:
   switching means for connecting said input lines to said transmission facilities;
   control means, said switching means being responsive thereto, for controlling said switching means, the improvement comprising:
   a circuit for determining whether an incoming signal represents speech or data, said circuit having;
   a means for separating low frequency components of said signal from high frequency components of said signal; and
   a means responsive to said separating means for comparing the energy level of said high frequency component with a multiple of the energy level of said low frequency component, whereby data is determined to be more likely than speech whenever the energy level of said high frequency component exceeds a multiple of the energy level of said low frequency component.

2. The circuit of claim 1 wherein said means for separating comprises a filter for passing signals above a specified frequency; and a filter for passing frequencies below said specified frequency.

3. The circuit of claim 2 wherein said specified frequency is approximately 1000 Hz.

4. The circuit of claim 3 wherein said multiple is 10 dB.

5. The circuit of claim 1 further comprising:
   a means responsive to said separating means for comparing said multiple of the energy level of said low frequency component with a maximum value, whereby the likelihood that said signal represents data rather than speech is increased whenever the multiple of the energy level of said low frequency components is less than said maximum value.

6. The circuit of claim 5 further comprising:
   a means responsive to said separating means for comparing the energy level of said high frequency components with a minimum value, whereby the likelihood that said signal represents data rather than speech is further increased whenever said energy level of said high frequency components exceeds said minimum value.

7. The circuit of claims 1, 5 or 6 further comprising:
   a slope detector means for determining whether said signal has a change in amplitude with respect to time whereby the likelihood that said signal represents data rather than speech is still further increased whenever there is no detected amplitude change with respect to time of said signal.

8. The circuit of claim 7 further comprising:
   a timing means responsive to each of said comparison means and to said slope detecting means whereby data rather than speech is determined to be present whenever the amplitude of said high frequency component exceeds said multiple of the energy level of said low frequency components for a predetermined time in which said multiple of the energy level of said low frequency component also is less than said maximum value, and in which the energy level of said high frequency component is also greater than said minimum value, and in which there is also no change in amplitude with respect to time of said signal, said predetermined period of time being determined by said timing means.

9. The circuit of claim 1 wherein said control means is responsive to said circuit whereby said switching means is inhibited whenever data is determined to be present.

10. The circuit of claim 1 further including:
   delay means connected between said input lines and said switching means; and
   means responsive to said control means for bypassing said delay means whenever data is determined to be present.

* * * * *